US011683727B2

(12) United States Patent
Xu et al.

(10) Patent No.: US 11,683,727 B2
(45) Date of Patent: Jun. 20, 2023

(54) COEXISTENCE OF REDCAP AND NON-REDCAP UES IN SL

(71) Applicant: QUALCOMM Incorporated, San Diego, CA (US)

(72) Inventors: Huilin Xu, Temecula, CA (US); Shuanshuan Wu, San Diego, CA (US); Jing Lei, San Diego, CA (US); Fei Huang, San Diego, CA (US); Duo Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 72 days.

(21) Appl. No.: 17/219,557

(22) Filed: Mar. 31, 2021

(65) Prior Publication Data

US 2022/0322155 A1 Oct. 6, 2022

(51) Int. Cl.
*H04W 28/26* (2009.01)
*H04W 8/24* (2009.01)
*H04W 72/02* (2009.01)
*H04W 72/0453* (2023.01)
*H04W 92/18* (2009.01)

(52) U.S. Cl.
CPC ............ *H04W 28/26* (2013.01); *H04W 8/24* (2013.01); *H04W 72/02* (2013.01); *H04W 72/0453* (2013.01); *H04W 92/18* (2013.01)

(58) Field of Classification Search
CPC ....... H04W 28/26; H04W 8/24; H04W 72/02; H04W 72/0453; H04W 92/18
See application file for complete search history.

(56) References Cited

U.S. PATENT DOCUMENTS

| | | | |
|---|---|---|---|
| 2018/0176747 A1* | 6/2018 | Li | ........................ H04W 52/325 |
| 2021/0006318 A1 | 1/2021 | Kim et al. | |
| 2021/0007081 A1* | 1/2021 | Shin | ...................... H04L 5/0055 |
| 2021/0022145 A1* | 1/2021 | Nan | ....................... H04L 5/0044 |
| 2021/0037468 A1* | 2/2021 | Huang | .................. H04W 76/28 |
| 2021/0127364 A1* | 4/2021 | Panteleev | ............... H04W 4/40 |
| 2021/0184812 A1* | 6/2021 | MolavianJazi | ........ H04L 5/0051 |
| 2021/0314966 A1* | 10/2021 | Hui | .................... H04W 72/0406 |

(Continued)

FOREIGN PATENT DOCUMENTS

| | | |
|---|---|---|
| EP | 3761546 A1 | 1/2021 |
| WO | WO-2015110228 A1 | 7/2015 |

(Continued)

OTHER PUBLICATIONS

International Search Report and Written Opinion—PCT/US2022/070821—ISA/EPO—dated May 23, 2022.

*Primary Examiner* — Yu-Wen Chang
(74) *Attorney, Agent, or Firm* — Qualcomm/Norton Rose Fulbright US LLP

(57) ABSTRACT

This disclosure provides systems, methods, and devices for wireless communication that support hybrid systems sidelink (SL) operations. In a first aspect, an apparatus obtains a resource reservation for a subsequent transmission over an SL, the reservation of a resource in a resource pool, and the resource spanning at least one sub-channel of a plurality of sub-channels. The apparatus further transmits an indication of the resource reservation to at least one other UE, where the UE is of a first type and the at least one other UE is of a second type. Other aspects and features are also claimed and described.

30 Claims, 11 Drawing Sheets

(56) References Cited

U.S. PATENT DOCUMENTS

| | | | |
|---|---|---|---|
| 2021/0337544 A1* | 10/2021 | Wang | H04W 4/06 |
| 2021/0385844 A1* | 12/2021 | Yuan | H04W 72/1278 |
| 2022/0046751 A1* | 2/2022 | Peng | H04W 76/25 |
| 2022/0174458 A1* | 6/2022 | Peng | H04W 72/0406 |
| 2022/0174745 A1* | 6/2022 | Lee | H04W 74/006 |
| 2022/0217702 A1* | 7/2022 | Zhang | H04W 72/0406 |
| 2022/0224491 A1* | 7/2022 | Salim | H04L 1/1854 |
| 2022/0225292 A1* | 7/2022 | Mohammad Soleymani | H04W 72/0406 |
| 2022/0232530 A1* | 7/2022 | Chae | H04W 72/02 |
| 2022/0232626 A1* | 7/2022 | Li | H04W 72/10 |
| 2022/0238021 A1* | 7/2022 | Kwak | H04W 92/18 |

FOREIGN PATENT DOCUMENTS

| | | |
|---|---|---|
| WO | WO-2019148376 A1 | 8/2019 |
| WO | WO-2019195138 A1 | 10/2019 |
| WO | WO-2020069111 A1 | 4/2020 |

\* cited by examiner

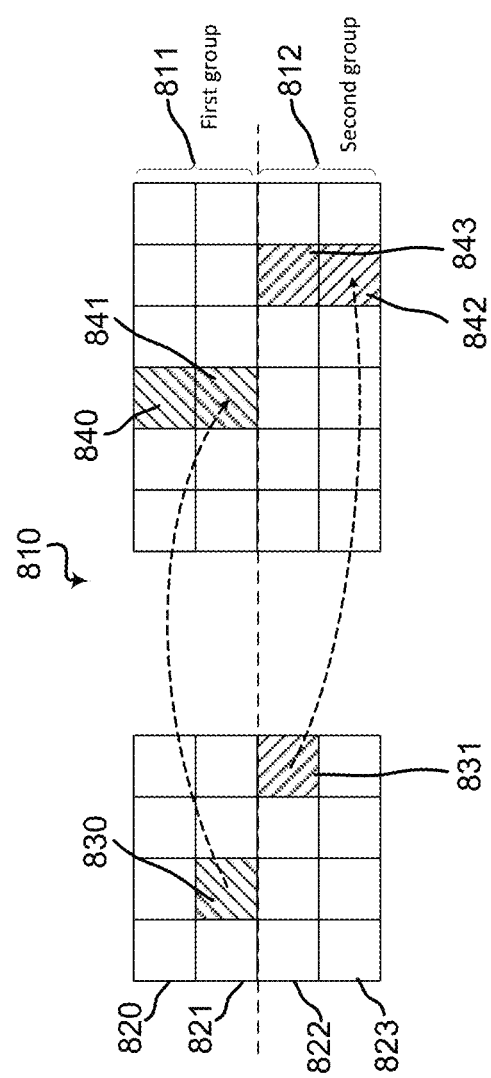

COEXISTENCE OF REDCAP AND NON-REDCAP UES IN SL

TECHNICAL FIELD

Aspects of the present disclosure relate generally to wireless communication systems, and more particularly, to sidelink communications Some features may enable and provide improved communications, including hybrid system sidelink communication operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes obtaining a resource reservation for a transmission over a sidelink (SL). In aspects, the resource reservation reserves an SL resource in a resource pool for subsequently transmitting data from the UE, and the SL resource spans at least one sub-channel of a plurality of sub-channels. The method further includes transmitting an indication of the resource reservation to at least one other UE. In aspects, the UE is of a first type and the at least one other UE is of a second type.

In an additional aspect of the disclosure, a method of wireless communication performed by a UE includes obtaining a reservation of a resource for a subsequent data transmission over an SL in at least one sub-channel of a resource pool. The at least one sub-channel is included in a first sub-channel group of a plurality of sub-channel groups. The method further includes receiving an indication of a reservation of a resource from at least one other UE in a sub-channel of a second sub-channel group, and transmitting an indication of the reservation of the resource in a sub-channel of the first sub-channel group.

In an additional aspect of the disclosure, an apparatus (e.g., a UE) configured for wireless communication is disclosed. The apparatus includes at least one processor, and a memory coupled to the at least one processor. The at least one processor is configured to obtain a resource reservation for a transmission over an SL. In aspects, the resource reservation reserves an SL resource in a resource pool for subsequently transmitting data from the UE, and the SL resource spans at least one sub-channel of a plurality of sub-channels. The at least one processor is further configured to transmit an indication of the resource reservation to at least one other UE. In aspects, the UE is of a first type and the at least one other UE is of a second type.

In an additional aspect of the disclosure, an apparatus (e.g., a UE) configured for wireless communication is disclosed. The apparatus includes at least one processor, and a memory coupled to the at least one processor. The at least one processor is configured to obtain a reservation of a resource for a subsequent data transmission over an SL in at least one sub-channel of a resource pool. The at least one sub-channel is included in a first sub-channel group of a plurality of sub-channel groups. The at least one processor is further configured to receive an indication of a reservation of a resource from at least one other UE in a sub-channel of a second sub-channel group, and to transmit an indication of the reservation of the resource in a sub-channel of the first sub-channel group.

In an additional aspect of the disclosure, an apparatus configured for wireless communication is disclosed. The apparatus includes means for obtaining a resource reservation for a transmission over an SL. In aspects, the resource reservation reserves an SL resource in a resource pool for subsequently transmitting data from the UE, and the SL resource spans at least one sub-channel of a plurality of sub-channels. The apparatus further includes means for transmitting an indication of the resource reservation to at least one other UE. In aspects, the UE is of a first type and the at least one other UE is of a second type.

In an additional aspect of the disclosure, an apparatus configured for wireless communication is disclosed. The apparatus includes means for obtaining a reservation of a resource for a subsequent data transmission over an SL in at least one sub-channel of a resource pool. The at least one sub-channel is included in a first sub-channel group of a plurality of sub-channel groups. The apparatus further includes means for receiving an indication of a reservation of a resource from at least one other UE in a sub-channel of a second sub-channel group, and means for transmitting an indication of the reservation of the resource in a sub-channel of the first sub-channel group.

In an additional aspect of the disclosure, a non-transitory computer-readable medium stores instructions that, when executed by a processor, cause the processor to perform operations including obtaining a resource reservation for a transmission over an SL. In aspects, the resource reservation reserves an SL resource in a resource pool for subsequently transmitting data from the UE, and the SL resource spans at least one sub-channel of a plurality of sub-channels. The operations further include transmitting an indication of the resource reservation to at least one other UE. In aspects, the UE is of a first type and the at least one other UE is of a second type.

In an additional aspect of the disclosure, a non-transitory computer-readable medium stores instructions that, when executed by a processor, cause the processor to perform operations including obtaining a reservation of a resource for a subsequent data transmission over an SL in at least one sub-channel of a resource pool. The at least one sub-channel is included in a first sub-channel group of a plurality of sub-channel groups. The operations further include receiving an indication of a reservation of a resource from at least one other UE in a sub-channel of a second sub-channel group, and transmitting an indication of the reservation of the resource in a sub-channel of the first sub-channel group.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 8A shows a diagram illustrating an example of non-overlapping sub-channel groupings according to one or more aspects.

Like reference numbers and designations in the various drawings indicate like elements.

DETAILED DESCRIPTION

Figure 1:
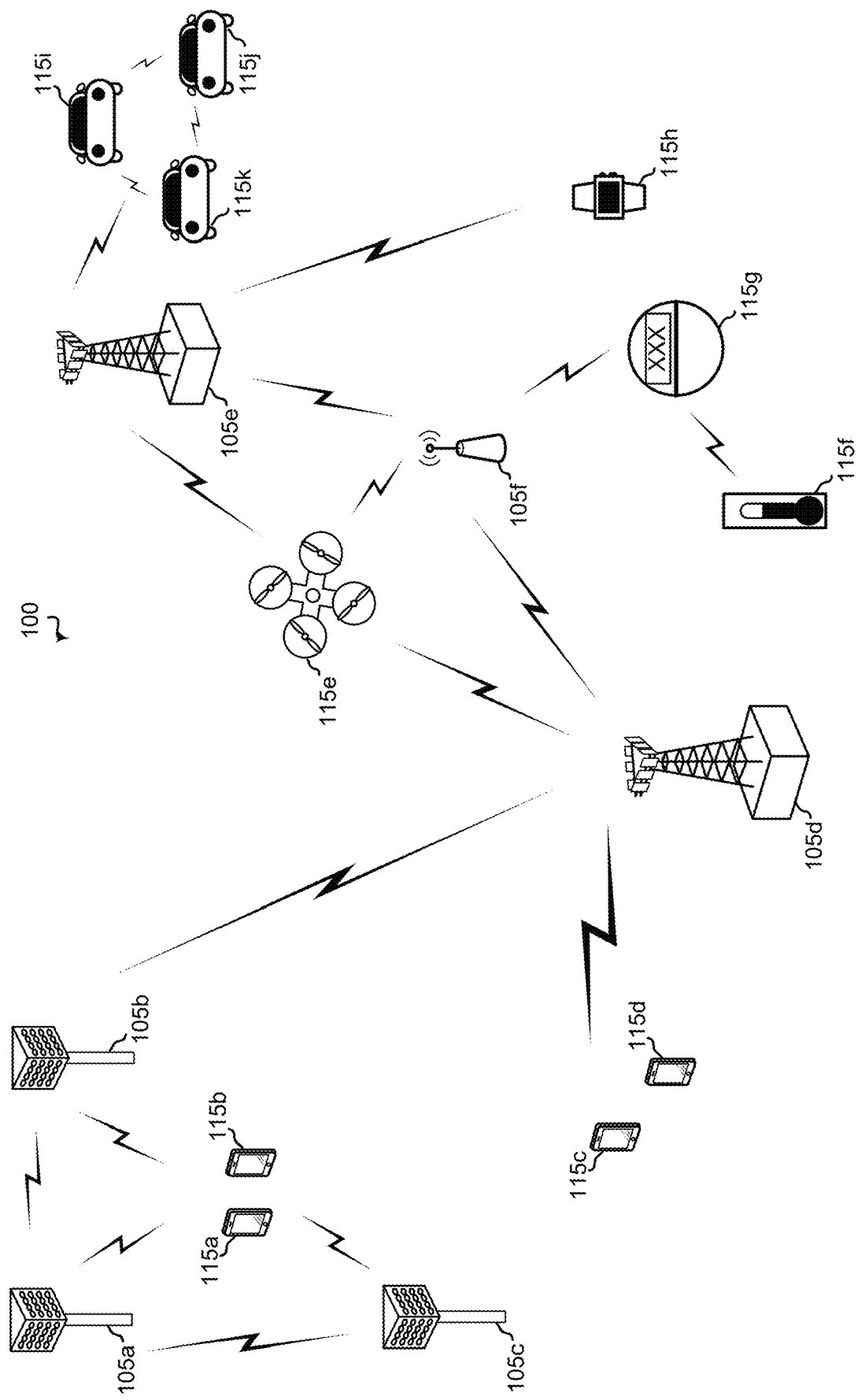
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support hybrid systems SL operations. In aspects, hybrid systems SL operations may refer to SL operations in systems that include UEs of different types, such as RedCap UEs and non-RedCap UEs. In particular, aspects of the present disclosure provide techniques and systems for controlling and managing SL resource allocation when RedCap UEs and non-RedCap UEs coexist in a system. In aspects, in hybrid systems SL operations, non-RedCap UEs and RedCap UEs may coexist on a same carrier (e.g., may transmit on a SL in a same carrier) and RedCap UEs may be configured to be able to detect resource reservations from non-RedCap UEs. In some aspects, non-RedCap UEs may be prompted, requested, or otherwise indicated and/or configured to limit a SL transmission power to avoid interfering with a RedCap UE that has not been able to detect the resource reservation of the non-RedCap UE. In still some other aspects, the various techniques herein support controlling and managing SL resource allocation between RedCap UEs This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
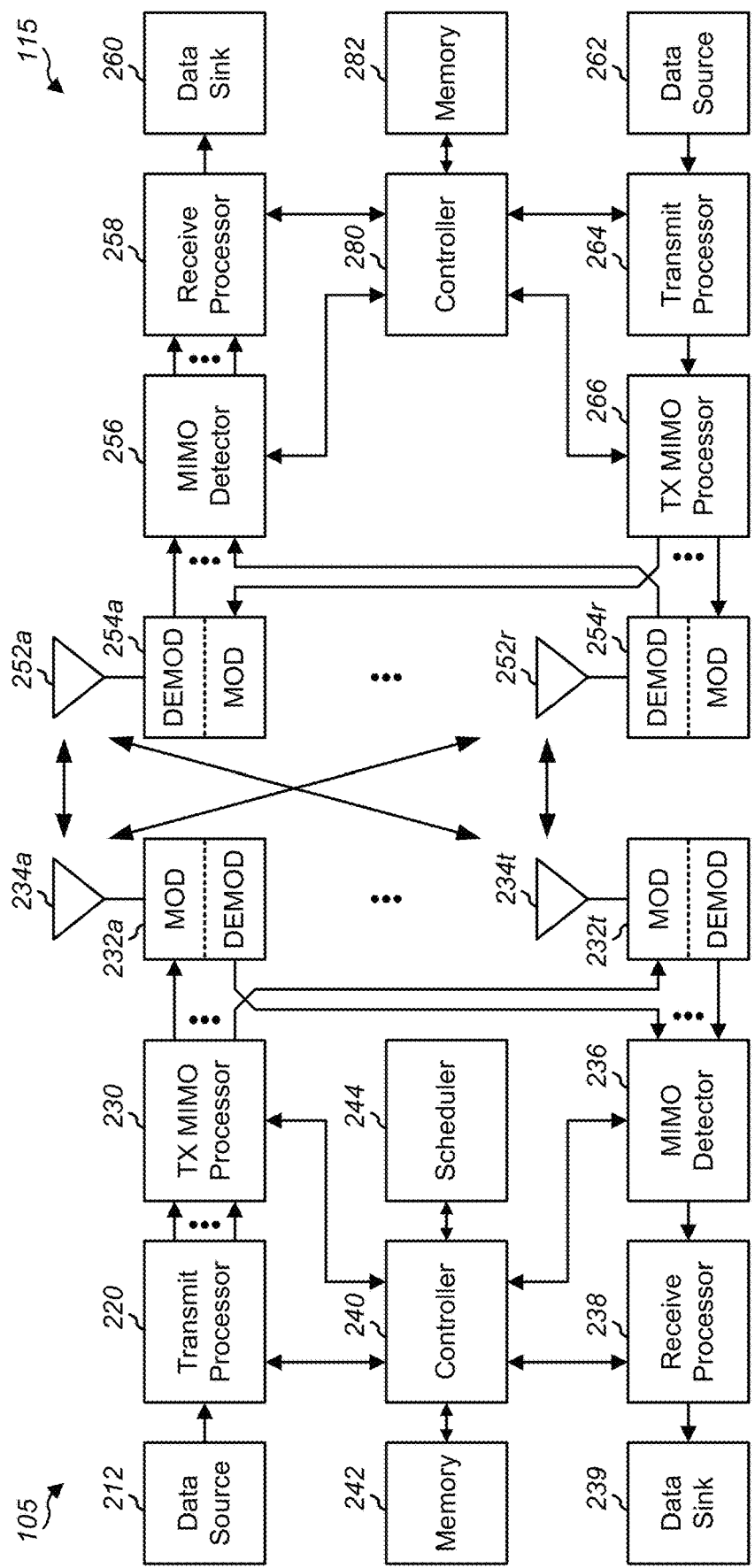
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 7, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
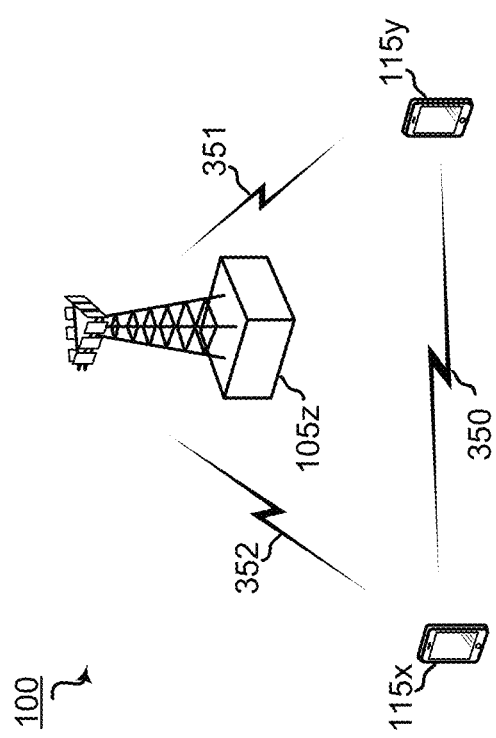
FIG. 3 is a block diagram illustrating details of an example wireless communication system that supports sidelink communications.

FIG. 3 is a block diagram illustrating details of an example wireless communication system 100. Wireless network 100 may include base station 105z, UE 115x, and UE 115y. It will be appreciated that network 100 may include further components such as additional base station and additional UEs. Thus, the discussion with respect to base station 105z, UE 115x, and UE 115y of FIG. 3 is by way of example, and not intended to be limiting in any way. In particular, in the example illustrated in FIG. 3, UE 115x and UE 115y may be in communication with each other via sidelink (SL) 350. In aspects, SL 350 may be a direct communication link via which UE 115x sends/receives messages directly to/from UE 115y, and via which UE 115y sends/receives messages directly to/from UE 115x. In implementations, UE 115x and UE 115y may be configured to follow an SL communication scheme in which transmission/reception takes place only in designated resources (e.g., time, frequency, etc.). As such, SL communications between UE 115x and UE 115y may be restricted to particular resources, and in these implementations no SL communications between UE 115x and UE 115y may take place outside these resources.

In some optional implementations, UE 115x and UE 115y may also be in communication with base station 105z. For example, UE 115x may communicate with base station 105z via link 352. Link 352 may include an uplink and/or a downlink. In some examples, UE 115y may communicate with base station 105z via link 351. Link 351 may include an uplink and/or a downlink. In some optional implementations, base station 105z may be a serving base station to one or both of UE 115x and UE 115y.

In some implementations, SL communications between UE 115x and UE 115y may operate in one of various modes. For example, SL communications between UE 115x and UE 115y over SL 350 may operate in SL mode 1, which may be a centralized mode. In SL mode 1, a base station (e.g., base station 105z) may serve as a centralized node, and may be configured to schedule SL transmissions and to allocate resources for those SL transmissions. In other aspects, SL communications between UE 115x and UE 115y over SL 350 may operate in SL mode 2, which may be a distributed mode. In SL mode 2, a UE (e.g., UE 115x and/or UE 115y) may autonomously schedule, and may autonomously determine resource allocations for, SL transmissions to another UE over an SL. For example, in SL mode 2, a UE may transmit to another UE over the SL, without the transmitting UE obtaining a transmission grant from the serving base station before it is allowed to transmit to the receiving UE over the SL. In this case, the transmitting UE may determine a resource allocation of the SL resources for the SL transmission to the other UE. For example, UE 115x may wish to transmit to UE 115y over SL 350. In that case, UE 115x may determine and/or allocate resources of SL 350 in which to schedule the SL transmission to UE 115y, without the need to request a transmission grant from base station 105z, or another base station.

Figure 4A:
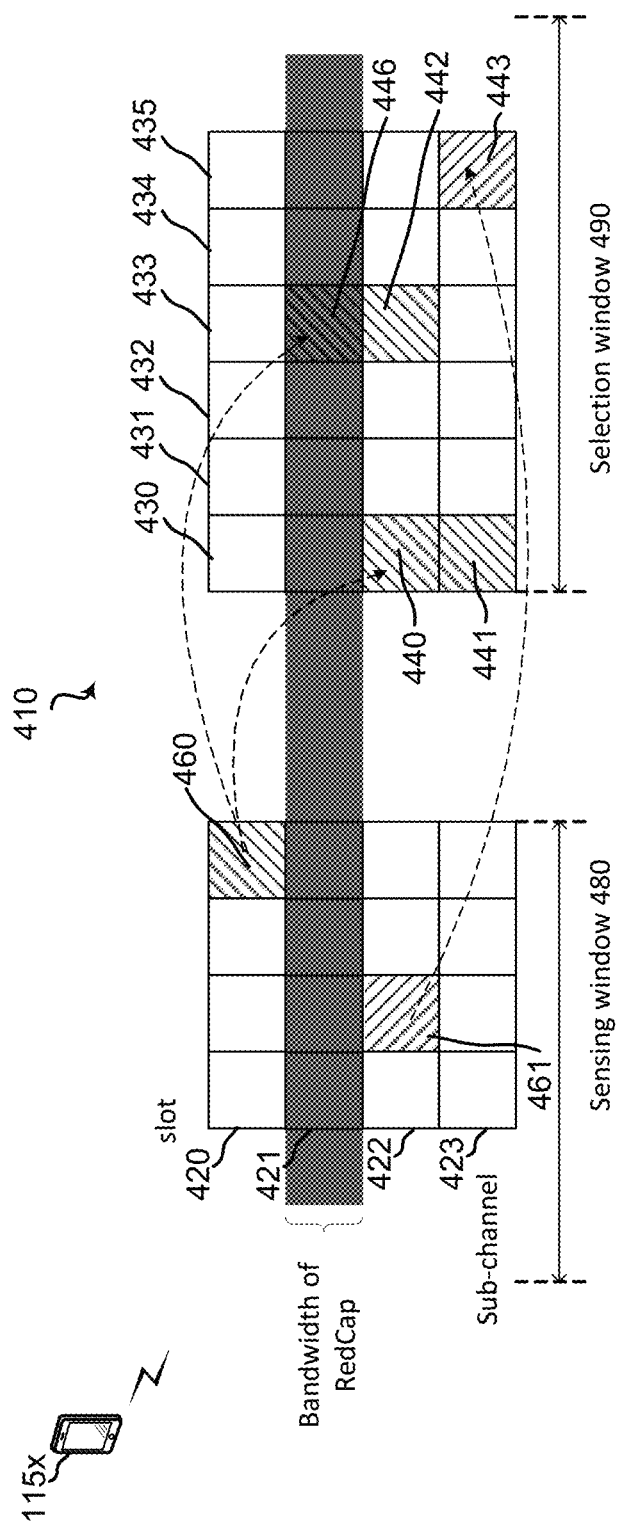
FIG. 4A is a diagram illustrating an example of a sidelink resource pool configuration.

In implementations, SL communications may be performed using resources from SL resource pools. The SL resource pools may include multiple resource allocation units. In aspects, a minimum resource allocation unit may be one sub-channel in the frequency domain and one slot in the time domain. FIG. 4A shows an example of SL resource pool 410, which includes sub-channels 420-423, and slots 430-435. As can be seen, resource pool 410 includes multiple resource allocation units, including resource allocation unit 440-443 and 446. In exemplary SL mode 2 communications, a transmitting UE may determine a resource allocation that includes one or more of the resource allocation units of SL resource pool 410, and may transmit to the receiving UE using those allocated resource.

In implementations of SL mode 2 communications, the transmitting UE may follow a particular scheme to allocate SL resources for SL transmissions. In SL mode 2 implementations, the resource allocation may be based on resource reservation based on SL transmissions monitoring. For example, a transmitting UE may reserve SL resources in future slots for future SL transmissions (e.g., for retransmission of the data packet) by decoding SCIs received from other SL UEs and measuring reference signal receive power (RSRP) from transmissions from other SL UEs in a sensing window, and then projecting the SCI decoding and RSRP measurements onto a selection window to identify available resources for the SL transmission. In particular, when a packet arrives for transmission at a transmitting UE, the transmitting UE may determine a sensing window (e.g., a window in the past), and may decode SCIs received from other SL UEs to identify resources that have been reserved in the selection window. For example, UE 115x may receive an SCI from UE 115y, which UE 115x may decode in sensing window 480. Referring to FIG. 4A, the SCI decoding may indicate reservations at 460 and 461. In implementations, the SCI decoding may be projected onto sensing window 490. Projecting the SCI decoding onto selection window 490 may indicate that resource allocation units 440-443 and 446 from SL resource pool 410 have already been reserved in selection window 490. Furthermore, transmitting UE 115x may also measure the RSRP from transmissions received from the other SL UEs (e.g., UE 115x) during the sensing window. The RSRP measurements may be projected onto the selection window. In implementations, a resource is considered available in the resource selection window when the resource is not reserved, and/or when it is reserved but the RSRP is less than a predetermined RSRP threshold. In either case, a transmitting UE may select the available resource for SL transmission to a UE. In some implementations, the transmitting UE may select an available resource randomly for the SL transmission.

In current implementations of wireless communication systems, special emphasis is put on support of premium devices (e.g., UEs using the eMBB protocol, such as smartphones, etc.) and other devices using protocols such as ultra-reliable low-latency communication (URLLC) and/or vehicle-to-everything (V2X) protocols, among others. Nonetheless, communication systems need to be scalable and deployable in a more efficient and cost-effective way. For example, peak throughput, latency, reliability requirements, etc., should be able to be relaxed in these systems. In addition, a greater emphasis should be put on efficiency (e.g. power consumption, system overhead, etc.) as well as cost improvements, which may be obtained by implementing an improved form factor (e.g. smaller supported bandwidth, fewer antennas, etc.).

One particular case in which the limitations of current systems is significant relates to reduced capabilities (RedCap) UEs, also known as NR-light UEs. A RedCap UE may be a device that has or is configured with limited capabilities when compared with a normal UE (also referred to herein as a regular UE, a premium UE, and/or a non-RedCap UE). RedCap UEs may include wearable device (e.g. smart watches, etc.), industrial wireless sensor networks (IWSN), surveillance cameras, IoT devices, sensors, low-end smartphones, etc. Current implementations of wireless communication systems have severe limitations with respect to RedCap UEs within the context of SL operations. In particular, current implementations fail to take advantage of SL communications with respect to RedCap UEs, as SL communications (e.g., SL relay functionality) may provide extended coverage and reduced power consumption, and may enable local communications between RedCap UEs and premium UEs.

Figure 4B:
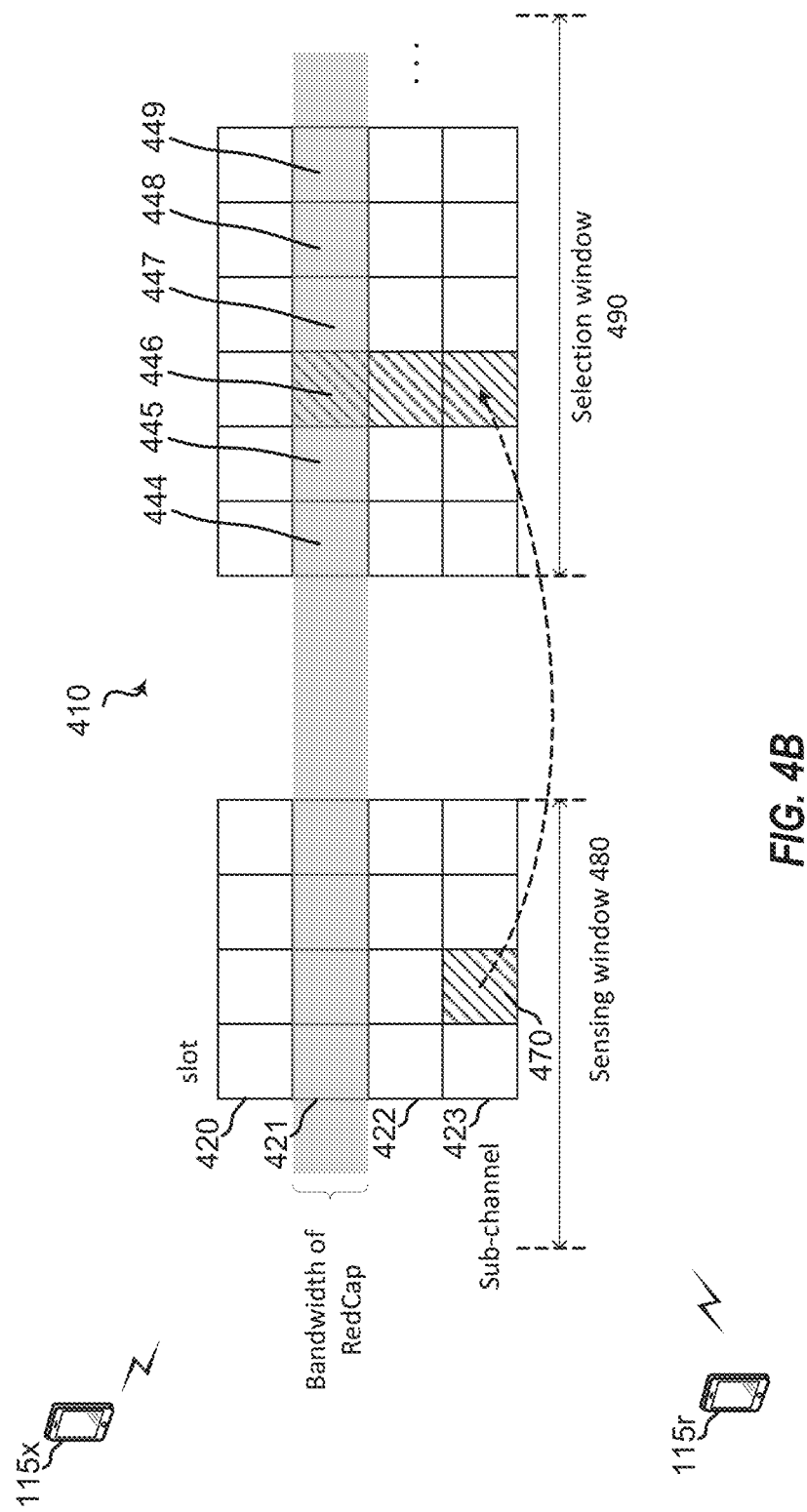
FIG. 4B is a diagram illustrating another example of a sidelink resource pool configuration.

However, inserting RedCap UEs into an SL communication scheme presents several problems. For example, RedCap UEs may support smaller bandwidths than regular or premium UEs For example, as illustrated in FIG. 4B, a bandwidth of a regular UE may include all resources of SL resource pool 410, which may include all sub-channels 420-423, and all slots 430-435. A such, a regular UE may operate in any of sub-channels 420-423. In this case, an SL transmission by a regular UE may occupy any of the resource allocation units of SL resource pool 410. In contrast, a RedCap UE may have a bandwidth that includes less than all the available sub-channels (e.g., one sub-channel, two sub-channels, etc.). For example, the bandwidth of a RedCap UE may include sub-channel 421. In this case, the RedCap UE may allocate any of resource allocation units 444-449, but no other resource allocation unit. However, a situation may arise in which a reservation for a resource may be transmitted (e.g., in an SCI) in a sensing window from another UE in a sub-channel in which the RedCap does not operate (e.g., in a sub-channel that is not part of the bandwidth of the RedCap UE). In this case, the RedCap UE may not "see" the resource reservation for the regular UE, and may consider the reserved resource in the selection window as available. For example, regular UE 115x may transmit a reservation in resource 470 in sub-channel 423. However, because RedCap UE 115r operates in sub-channel 421 and not in sub-channel 423, RedCap UE 115r may not detect the resource reservation in resource 470. As a result, RedCap UE 115r, after performing SCI decoding and RSRP measurement, and projecting the results upon selection window 490, may determine, mistakenly, that resource 446 in selection window 490 is available, when in fact resource 446 has been reserved by regular UE 115x in selection window 490.

Various aspects of the present disclosure are directed to systems and methods that support hybrid systems SL operations. In aspects, hybrid systems SL operations may refer to SL operations in systems that include UEs of different types, such as RedCap UEs and non-RedCap UEs. In particular, aspects of the present disclosure provide techniques and systems for controlling and managing SL resource allocation when RedCap UEs and non-RedCap UEs coexist in a system. In aspects, in hybrid systems SL operations, non-RedCap UEs and RedCap UEs may coexist on a same carrier (e.g., may transmit on a SL in a same carrier) and RedCap UEs may be configured to be able to detect resource reservations from non-RedCap UEs. In some aspects, non-RedCap UEs may be prompted, requested, or otherwise indicated and/or configured to limit a SL transmission power to avoid interfering with a RedCap UE that has not been able to detect the resource reservation of the non-RedCap UE. In still some other aspects, the various techniques herein support controlling and managing SL resource allocation between RedCap UEs.

In aspects, the techniques that enable controlling and managing SL resource allocation when RedCap UEs and non-RedCap UEs coexist in a system may include techniques for a UE (e.g., a non-RedCap UE or a RedCap UE) obtaining a resource reservation for a subsequent SL data transmission, and for transmitting an indication of the resource reservation to other UEs, which may include RedCap UEs.

In some aspects, the RedCap UE may modify the data transmission (e.g., may reduce the maximum transmit power, or may cancel the data transmission altogether) based on a determination that a RedCap UE may have failed to detect the indication of the resource reservation.

In still some aspects, the techniques disclosed herein provide for controlling and managing SL resource allocation between RedCap UEs by providing techniques for grouping sub-channels of a resource pool to ensure that resource reservations by one RedCap UE are detected and/or deconflicted with resource reservations from another RedCap UE.

Figure 5:
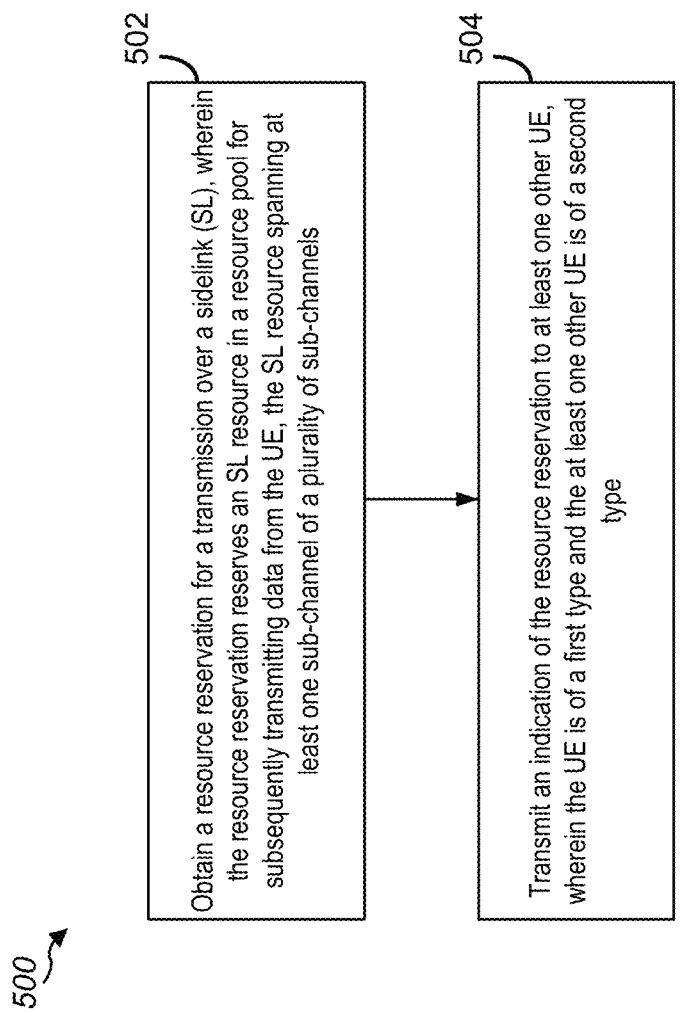
FIG. 5 is a flow diagram illustrating an example process that supports hybrid systems sidelink operations according to one or more aspects.
Figure 9:
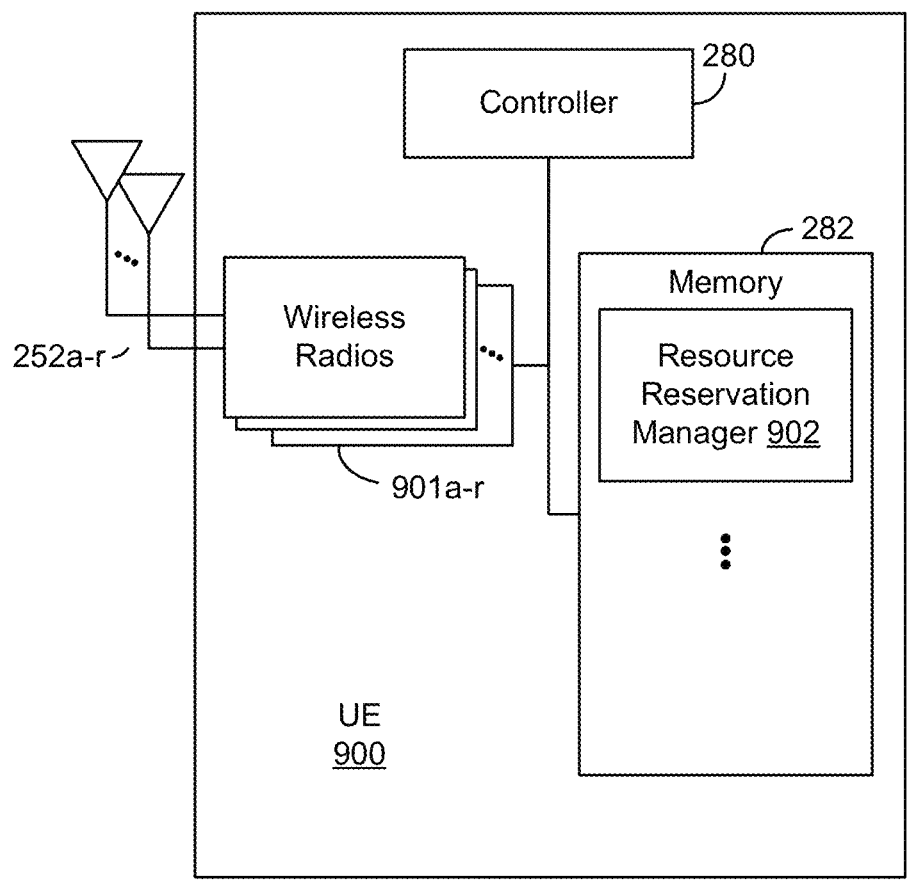
FIG. 9 is a block diagram of an example UE that supports hybrid systems sidelink operations according to one or more aspects.

FIG. 5 is a flow diagram illustrating an example process 500 that supports hybrid systems SL operations according to one or more aspects. Operations of process 500 may be performed by a UE, such as UE 115 described above with reference to FIGS. 1 and 2, or a UE described with reference to FIG. 9. For example, example operations (also referred to as "blocks") of process 500 may enable UE 115 to support hybrid systems SL operations. FIG. 9 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 502, a UE obtains a resource reservation for a subsequent data transmission over an SL. In order to implement the functionality for such operations, UE 115, under control of controller/processor 280, executes resource reservation manager 902, stored in memory 282. The functionality implemented through the execution environment of resource reservation manager 902 allows for UE 115 to perform resource reservation operations according to the various aspects herein. In aspects, the resource reservation may include a reservation of an SL resource in a resource pool (e.g., resource pool 410) in which the subsequent data transmission may be transmitted by the UE. In aspects, the reserved resource for SL data transmission by the UE may span at least one sub-channel of the sub-channels included in the resource pool, and may span a plurality of channels.

Figure 6:
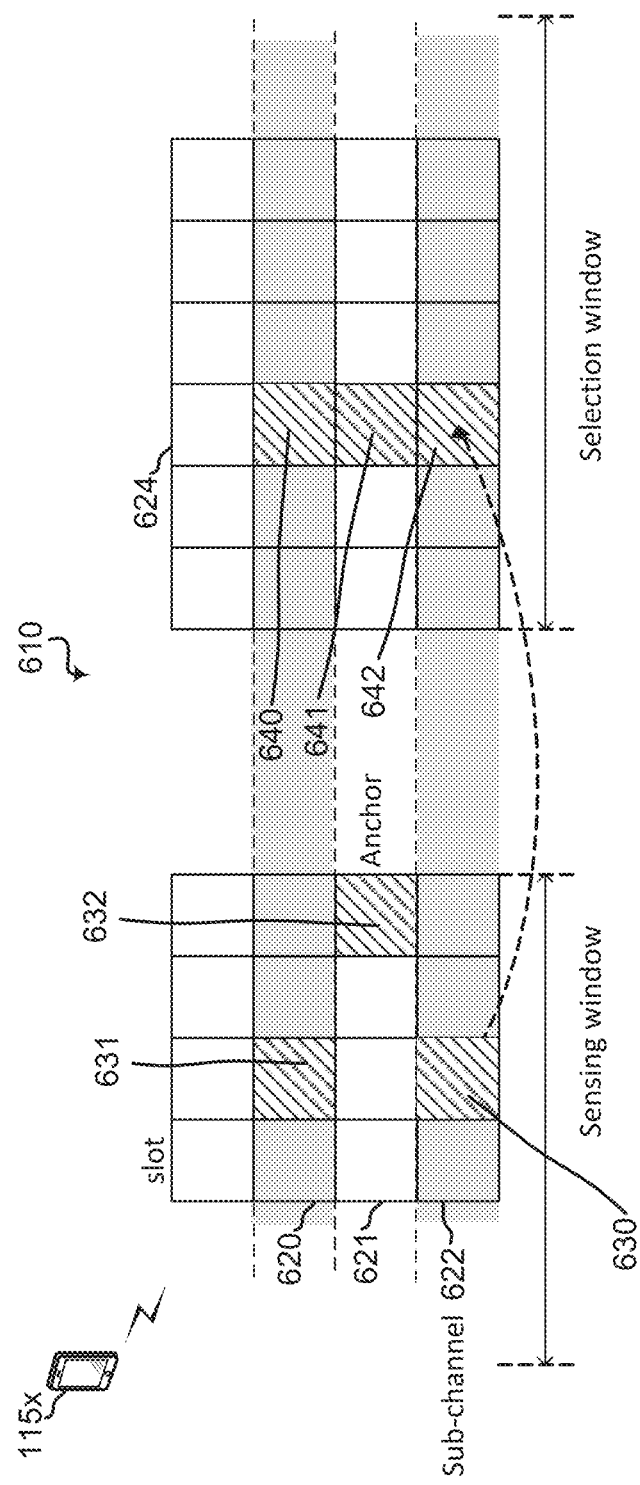
FIG. 6 is an illustration of a resource reservation in accordance with aspects of the present disclosure.

FIG. 6 shows an illustration of a resource reservation in accordance with aspects of the present disclosure. As shown, UE 115x may obtain a reservation of resources 640-642 in resource pool 610. In aspects, UE 115x may obtain this reservation for a subsequent data transmission over the SL to at least one other UE. The reserved resources span more than one sub-channel in resource pool 410. In particular, resources 640-642 span three sub-channels, namely sub-channels 620-622 in the frequency-domain, and are occupy slot 624 in the time-domain.

With reference back to FIG. 5, at block 504, the UE transmits an indication of the resource reservation to at least one other UE. In aspects, the UE may be of a first type (e.g., may be a non-RedCap UE) and the at least one other UE may be of a second type (e.g., may be a RedCap UE) and may include a plurality of other UEs (e.g., a plurality of RedCap UEs). In aspect, the indication of the resource reservation may be encoded in a control information message, such as an SCI. The UE may transmit the indication of the resource reservation in accordance with aspects of the present disclosure to ensure that the at least one other RedCap UE detects the resource reservation by the UE (and such that the at least one other RedCap UE may obtain a resource reservation based on the indication of the resource reservation by the UE, e.g., the at least one other RedCap UE obtains a reservation of a resource that is not the resource reserved by the UE). In this manner, the features provided by the present disclosure enable a system to address and even prevent the problems described above in which the RedCap UE may not detect the non-RedCap UEs resource reservation.

In aspects, transmitting the indication of the resource reservation to the at least one other UE may be based on information previously obtained regarding the presence and/or operating bandwidth of the RedCap UE. For example, the non-RedCap UE may obtain information about other neighboring RedCap UEs. In aspects, neighboring RedCap UEs may broadcast, or may transmit to the non-RedCap UE, the information. In some aspects, a base station (e.g., a serving base station) may transmit the RedCap UEs' information to the non-RedCap UE.

The information received by the non-RedCap UE about other neighboring RedCap UEs may include an indication of the RedCap UE's presence and information about the RedCap UEs operating bandwidth. The information regarding the RedCap UE's presence may include an indication indicating to the non-RedCap UE that the RedCap UE is in the neighborhood of the non-RedCap UE. In some cases, the non-RedCap UE may determine that the RedCap UE is in the neighborhood by the mere fact of receiving a presence indication. In aspects, the non-RedCap UE may maintain a timer for keeping track of the presence of RedCap UEs. In these cases, a presence timer is started and if no RedCap UE is sensed or detected before the timer expires, the non-RedCap UE determines that there is no RedCap UE anymore and may proceed accordingly (e.g., may reserve a resource, and may transmit the resource reservation, without consideration that there is a RedCap UE). On the other hand, if a RedCap is detected or sensed before the presence timer expires, the presence timer is reset or restarted. In some aspects, individual presence timers may be configured for each RedCap supported bandwidth, or may be configured per sub-channel of the resource pool.

In aspects, the information received by the non-RedCap UE about other neighboring RedCap UEs may include an indication of the RedCap UE's operating bandwidth. The indication of the operating bandwidth may include an indication of the operating bandwidth size (e.g., how many sub-channels the RedCap UE operates in), the operating bandwidth (e.g., which specific sub-channels the RedCap UE operates in), and/or the operating bandwidth supported (e.g., how many and/or which sub-channels the RedCap UE supports).

In aspects, the non-RedCap UE may use the received information about the RedCap UEs to determine whether any of the sub-channels spanned by the resource reserved by the non-RedCap UE are within the operating bandwidth of the RedCap UE (or of any of the neighboring RedCap UEs). When it is determined that at least one sub-channel spanned by the resource reserved by the non-RedCap UE is within the operating bandwidth of the at least one other UE (e.g., the RedCap UE or any neighboring RedCap UE), the non-Redcap UE may transmit the indication of the resource reservation to the at least one other UE (e.g., the RedCap UE or any neighboring RedCap UE) in a sub-channel of the operating bandwidth of the at least one other UE. FIG. 6 illustrates this functionality.

As shown in FIG. 6, non-RedCap UE 115x may determine to transmit an indication of the reservation of resources 640-642. In this example, information received by non-RedCap UE 115x about neighboring RedCap UEs may indicate that sub-channel 622 is within the operating bandwidth of at least one neighboring RedCap UE. In this case, non-RedCap UE 115x may transmit indication 630, which is an indication of the reservation of resources 640-642, in sub-channel 622.

In some aspects, as noted above, the non-RedCap UE may receive bandwidth information from multiple neighboring RedCap UEs. In aspects, the multiple neighboring RedCap UEs may in fact have different operating bandwidth including different sub-channels. In these cases, the non-RedCap UE may transmit the indication of the resource reservation in multiple channels such that an indication is sent in a sub-channel within the operating bandwidths of each neighboring RedCap UE. For example, as shown in FIG. 6, a second RedCap UE may be present, and the operating bandwidth of the second UE may include sub-channel 622. In this case, thus, non-RedCap UE 115x may determine that the reserved resources 640-642 span sub-channels 620-622 and are within the operating bandwidths of both neighboring RedCap UEs (sub-channel 620 and 622, respectively). In this case, non-RedCap UE 115x may transmit indication 630 and indication 631, both of which are indications of the reservation of resources 640-642, in sub-channels 620 and 622.

It is noted that in the technique described above, the non-RedCap UE obtains information about the operating bandwidth of neighboring RedCap UEs. However, in some aspects, the non-RedCap UE does not need to obtain information about the specific sub-channels in which the neighboring RedCap UEs are operating. In these aspects, the non-RedCap UE may transmit the indication of the resource reservation in any sub-channel that is within any operating bandwidth supported by any of RedCap UEs supported in the system. Further, in these aspects, it is assumed that non-RedCap UEs and RedCap UEs are deployed in overlapping bandwidths. In these aspects, by transmitting the indication of the resource reservation in any possible sub-channel that is within all RedCap UEs operating bandwidths, the non-RedCap UE ensures that the indication of the resource reservation may be detected by any RedCap UE. In this manner, the non-RedCap UE does not need to know whether a RedCap UE is present or not, or the operating bandwidth of the RedCap UEs. It is noted that, in a worst case scenario (e.g., when a RedCap UE is deployed over each sub-channel of the available bandwidth of the resource pool (e.g., when frequency hopping across all sub-channels is supported)), the non-RedCap UE may be required to send the indication of the resource reservation over all sub-channels simultaneously in order to ensure that all RedCap UEs detect the resource reservation.

In aspects, transmitting the indication of the resource reservation to the at least one other UE may include transmitting the indication of the resource reservation in a predefined anchor sub-channel. For example, at least one sub-channel of the available bandwidth may be predetermined or predefined as an anchor sub-channel. In aspects, the predefined anchor sub-channel may include more than one sub-channel. In these aspects, the non-RedCap UE transmit the indication of the resource reservation on the predefined anchor sub-channel. The RedCap UEs operating in the system (and deployed in overlapping bandwidth with the non-RedCap UEs) may be configured to detect the indication of the resource indication by sensing the predefined anchor sub-channel. For example, as shown in FIG. 6, sub-channel 621 may be predefined as an anchor channel. In this example, non-RedCap UE 115x may transmit indication 632, which is an indication of the reservation of resources 640-642, in anchor sub-channel 621. In aspects, the at least one other UE, which may include other RedCap UEs, may be configured to detect indication 632 on anchor sub-channel 621. In this manner, the RedCap UEs need only look to the anchor sub-channel for any resource reservation indications to determine whether a resource is reserved or not. Furthermore, this technique also allows the non-RedCap UEs to transmit the resource reservation indications to other UEs (RedCap and non-RedCap) to ensure the resource reservations are detected, without having to determine the other UEs' operating bandwidth, supported sub-channels, presence, etc.

As mentioned above, in aspects, the predefined anchor sub-channel may include more than one sub-channel. In these aspects, transmitting the indication of the resource reservation to the at least one other UE may include transmitting the indication of the resource reservation in each predefined anchor sub-channel concurrently or simultaneously. In some aspects, transmitting the indication of the resource reservation to the at least one other UE may include transmitting the indication of the resource reservation in each predefined anchor sub-channel sequentially, or in a particular order. In aspects, the sequence or particular order in which the indication is transmitted in each of the multiple anchor sub-channels may include a predefined time domain pattern.

In the discussion above, techniques for ensuring that RedCap UEs detect indications of a resource reservation transmitted by a non-RedCap UE were discussed. However, the present disclosure also provides techniques for addressing problems that arise when the RedCap UE does not detect an indication of a resource reservation.

In aspects, the UE (e.g., the non-RedCap UE) may determine that the at least one other UE (e.g., RedCap UE(s)) may have failed to detect the indication of the resource reservation transmitted from the non-RedCap UE. In some cases, the non-RedCap UE may not have even transmitted the indication of the resource reservation. In aspects, the non-RedCap UE may detect that at least one RedCap UE may have failed to detect the indication of the resource reservation transmitted from the non-RedCap UE because the non-RedCap UE may detect that at least part of the reserved resources may have been subsequently reserved (subsequent to the transmission of the resource reservation indication) by the RedCap UE. The resource reservation by the RedCap UE of the same resources as the ones reserved by the non-RedCap UE is an indication that the RedCap UE may have failed to detect the indication of the resource reservation from the non-RedCap UE. However, the non-RedCap UE may determine to modify the data transmission over the SL in the reserved resources in response to the determination that at least one RedCap may have failed to detect the indication of the resource reservation.

In aspects, the non-RedCap UE may modify the data transmission over the SL in the reserved resources by transmitting the data using a reduced maximum transmission power. In aspects, the reduced maximum transmission power may refer to a transmission power that is less than a transmission power used by the non-RedCap UE for SL transmissions when no RedCap UEs are considered to be present in the system. For example, a non-RedCap UE may transmit data on an SL using a maximum transmit power when the non-RedCap UE considers that no RedCap UEs are present. In this example, the non-RedCap UE may decide, when at least one RedCap UE is present in the system, to transmit in the SL using a reduced maximum transmit power. In aspects, the non-RedCap UE may determine to transmit using the reduced maximum transmit power in response to determining that at least one RedCap UE did not detect an indication of a resource reservation. By reducing the maximum transmit power, the non-RedCap UE may facilitate a reduction in the impact on a RedCap UE that may also reserve and transmit in the same reserved resources.

In aspects, the non-RedCap UE may modify the data transmission over the SL in the reserved resources by canceling the transmission the data over the SL in the reserved resources. In aspects, the non-RedCap may prioritize SL transmissions from RedCap UEs over SL transmissions from non-RedCap UEs, as non-RedCap UEs are more likely to detect and avoid conflicts with RedCap UEs because non-RedCap UEs may be able to detect resource reservations from RedCap UEs.

In some aspects, the non-RedCap UE may detect a resource reservation by a RedCap UE of the same resources that the non-RedCap UE may be reserving or may have reserved. In this case, the non-RedCap UE may determine to not use or reserve the same resources that have been indicated as reserved by the RedCap UE. Instead, the non-RedCap UE may obtain a resource reservation of a different resource in the resource pool.

In current implementations of wireless systems, and in particular in implementations involving SL communications between RedCap UEs, interferences between these RedCap UEs is a problem. Specifically, in a situation in which RedCap UEs in a system may use any sub-channel in the resource pool, and when frequency hopping is supported between sensing and resource selection, a similar issue as discussed above may occur in that a RedCap UE may not be able to detect a resource reservation indication from another RedCap UE, and the RedCap UE may reserve the same resource that has been reserved by the other RedCap UE, thereby creating the same issues discussed above.

Aspects of the present disclosure provide techniques for addressing the above issues by providing for grouping sub-channels of a resource pool to ensure that resource reservations by one RedCap UE are detected and/or de-conflicted with resource reservations from another RedCap UE.

Figure 7:
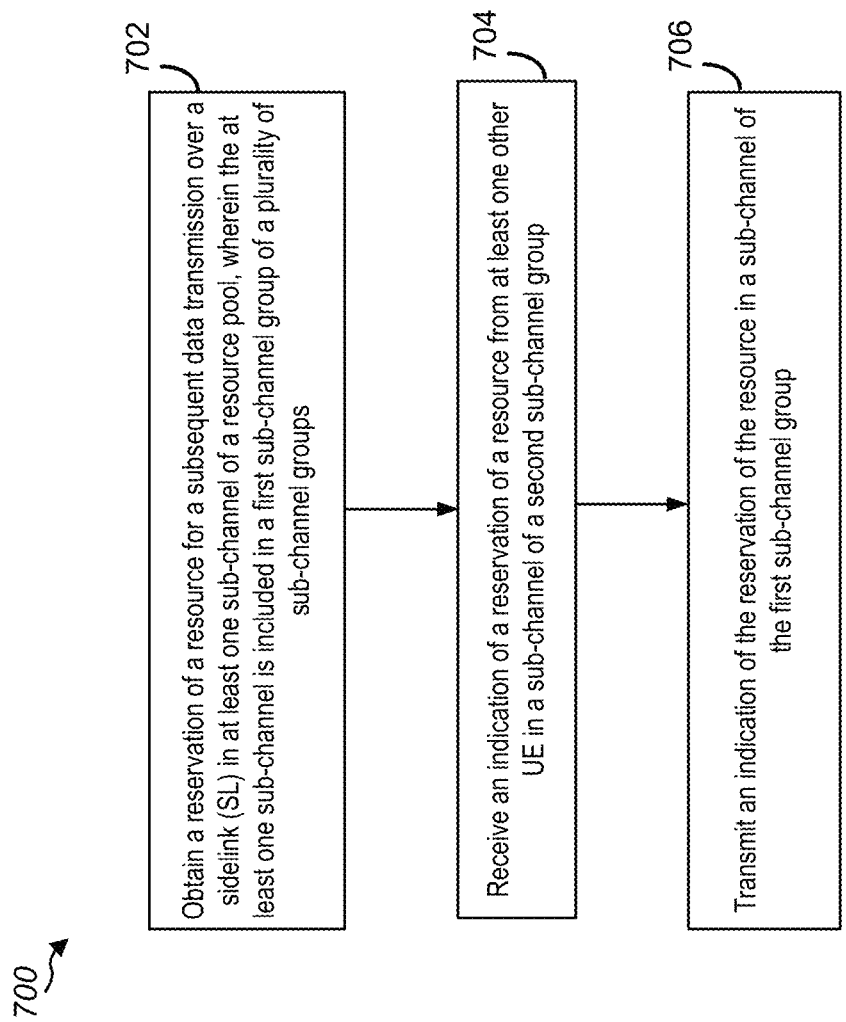
FIG. 7 is a flow diagram illustrating an example process that supports controlling and managing SL resource allocation between RedCap UEs according to one or more aspects.

FIG. 7 is a flow diagram illustrating an example process 700 that supports controlling and managing SL resource allocation between RedCap UEs according to one or more aspects. Operations of process 700 may be performed by a UE, such as UE 115 described above with reference to FIGS. 1 and 2, or a UE described with reference to FIG. 9.

At block 702, a UE (e.g., a RedCap UE) may obtain a reservation of a resource for a subsequent data transmission over an SL. In aspects, the reserved resource may be in at least one sub-channel of a resource pool, and the at least one sub-channel may be included in a first sub-channel group of a plurality of sub-channel groups.

At block 704, the UE receives an indication of a reservation of a resource from at least one other UE (e.g., at least one other RedCap UE) in a sub-channel of a second sub-channel group. At block 706, the UE transmits an indication of the reservation of the resource in a sub-channel of the first sub-channel group.

In aspects, the first sub-channel group and the second sub-channel group may be part of a plurality of previously defined, or dynamically defined, sub-channel groups. The resource pool may be divided into the plurality of sub-channel groups. In aspects, each sub-channel group may have a bandwidth (e.g., a span of sub-channels in the resource pool) and a bandwidth size. A group bandwidth size may be limited by a maximum supported bandwidth of the RedCap UEs in the system.

In aspects, all reserved resources and any transmission of an indication of the reserved resources may be performed within the same sub-channel group. When more than one RedCap UE attempts to reserve a resource or resources from a same sub-channel group, each RedCap UE may be able to detect or sense resource reservations by the other RedCap UEs. In this manner, the sub-channel grouping techniques described herein ensure that a RedCap UE is able to detect a resource reservation by another.

In aspects, the sub-channel groups may or may not overlap with each other. The transmission of the indication of the resource reservation may be dependent on whether and how the different sub-channel groups overlap. FIG. 8A shows a diagram illustrating an example of non-overlapping sub-channel groupings. In particular, as can be shown, resource pool 810 may be divided into first sub-channel group 811 and second sub-channel group 812. First sub-channel group 811 may include sub-channel 820 and sub-channel 821. Second sub-channel group 812 may include sub-channel 822 and sub-channel 823. As can be appreciated, in this example, first sub-channel group 811 and second sub-channel group 812 are non-overlapping sub-channel groups, as there are no sub-channels that belong to both groups. In this case, as will also be appreciated, a resource allocation in one group may not impact a resource allocation in another group. For example, a RedCap UE may obtain a resource reservation of resource allocation units 840 and 841 which span sub-channels 820 and 821 in sub-channel group 811. Another RedCap UE may obtain a resource reservation of resource allocation units 842 and 843 which span sub-channels 822 and 823 in sub-channel group 812. As there is no overlap, each resource reservation may be indicated in any resource and sub-channel within the respective sub-channel group. For example, the resource reservation of resource allocation units 840 and 841 may be indicated in any of sub-channel 820 or 821, and in the example illustrated is indicated in resource 830 within sub-channel 821. The resource reservation of resource allocation units 842 and 843 may be indicated in any of sub-channel 822 or 823, and in the example illustrated is indicated in resource 831 within sub-channel 822.

Figure 8B:
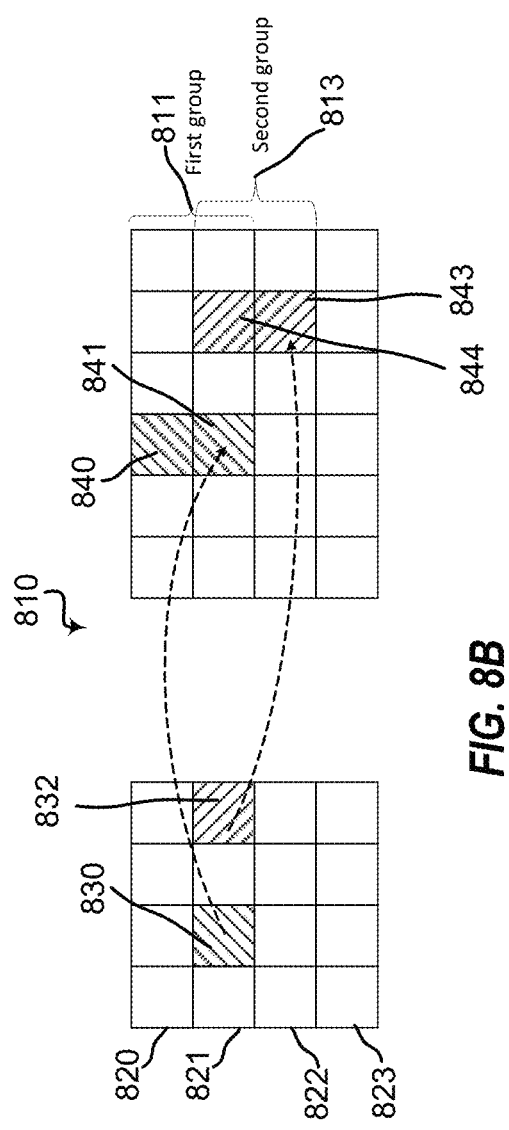
FIG. 8B shows a diagram illustrating an example of partial-overlapping sub-channel groupings according to one or more aspects.

However, it is noted that, when the sub-channel groups overlap, a resource reservation in one sub-channel group may affect a resource reservation in another sub-channel group. FIG. 8B shows a diagram illustrating an example of a partial-overlapping sub-channel groupings. In particular, as can be shown, resource pool 810 may be divided into first sub-channel group 811 and second sub-channel group 813. First sub-channel group 811 may include sub-channel 820 and sub-channel 821. Second sub-channel group 813 may include sub-channel 821 and sub-channel 822. As can be appreciated, in this example, first sub-channel group 811 and second sub-channel group 812 partially overlap, as both sub-channel groups include sub-channel 821. In this case, a resource allocation in one group that includes a resource in an overlapping sub-channel (e.g., a sub-channel that included in more than one sub-channel group) may only be indicated (e.g., an indication of the resource reservation may only be transmitted) in an overlapping sub-channel. For example, a RedCap UE may obtain a resource reservation of resource allocation units 840 and 841 which span sub-channel 820 and overlapping sub-channel 821 in sub-channel group 811. Another RedCap UE may obtain a resource reservation of resource allocation units 843 and 844 which span overlapping sub-channel 821 and sub-channel 823 in sub-channel group 813. In this case, the indications of the resource reservations for both RedCap UEs may only be transmitted in overlapping sub-channel 821. For example, the indication 830 of the reservation of resource allocation units 840 and 841 may be indicated only in overlapping sub-channel 821, and not in sub-channel 820 of the first sub-channel group 811. In the same example, the indication 832 of the reservation of resource allocation units 843 and 844 may be indicated only in overlapping sub-channel 821, and not in sub-channel 822 of the second sub-channel group 813.

Figure 8C:
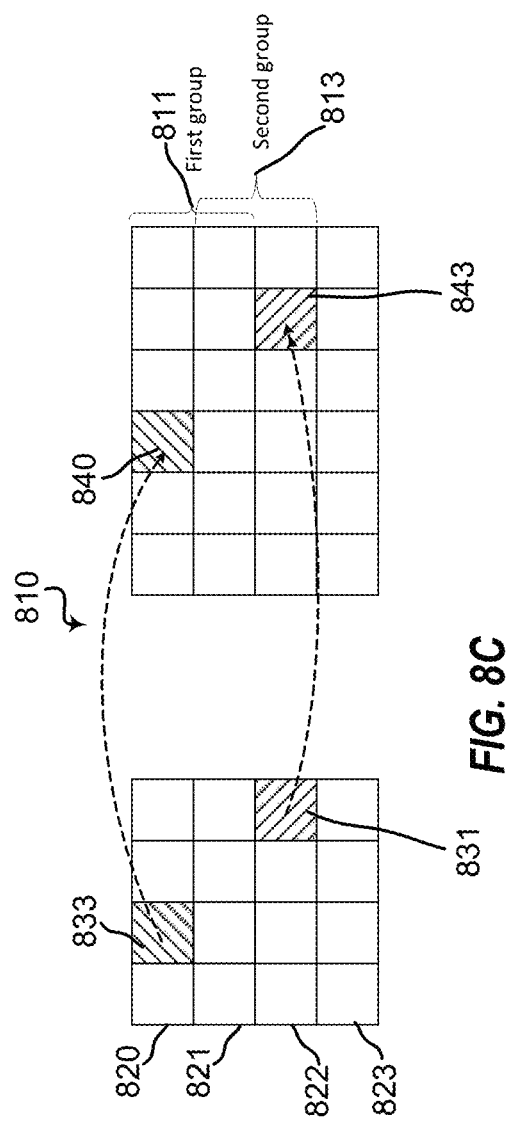
FIG. 8C shows a diagram illustrating another example of partial-overlapping sub-channel groupings according to one or more aspects.

FIG. 8C shows another diagram illustrating an example of a partial-overlapping sub-channel groupings. In particular, as can be shown, resource pool 810 may be divided into first sub-channel group 811 and second sub-channel group 813. First sub-channel group 811 may include sub-channel 820 and sub-channel 821. Second sub-channel group 813 may include sub-channel 821 and sub-channel 822. As can be appreciated, in this example, first sub-channel group 811 and second sub-channel group 812 partially overlap, as both sub-channel groups include sub-channel 821. In this case, a resource allocation in one group that includes a resource that is not in an overlapping sub-channel (e.g., a sub-channel that included in more than one sub-channel group) may be indicated (e.g., an indication of the resource reservation may only be transmitted) in any sub-channel of the respective sub-channel group, including an overlapping sub-channel. For example, a RedCap UE may obtain a resource reservation of resource allocation unit 840 which spans sub-channel 820, but does not span an overlapping sub-channel (e.g., overlapping channel 821) in first sub-channel group 811. Another RedCap UE may obtain a resource reservation of resource allocation unit 843 which spans sub-channel 822 but does not span an overlapping sub-channel (e.g., overlapping channel 821) in second sub-channel group 813. In this case, the indications of the resource reservations may be indicated in any resource and sub-channel within the respective sub-channel group, including overlapping sub-channels. For example, the resource reservation of resource allocation unit 840 may be indicated in any of sub-channel 820 or 821, and in the example illustrated is indicated in resource 833 within sub-channel 820. The resource reservation of resource allocation unit 843 may be indicated in any of sub-channel 821 or 822, and in the example illustrated is indicated in resource 831 within sub-channel 822.

In aspects, techniques for addressing the issues that arise from SL resource allocation operations between RedCap UEs (as discussed above) may also include transmitting indications of resource reservations in a predefined anchor sub-channel. For example, at least one sub-channel of the resource pool may be predetermined or predefined as an anchor sub-channel. In aspects, the predefined anchor sub-channel may include more than one sub-channel. In these aspects, a RedCap UE may transmit an indication of a resource reservation on the predefined anchor sub-channel. Other RedCap UEs may be configured to detect the indication of the resource indication by sensing the predefined anchor sub-channel. In this manner, the RedCap UEs need only look to the anchor sub-channel for any resource reservation indications to determine whether a resource is reserved or not.

As mentioned above, in aspects, the predefined anchor sub-channel may include more than one sub-channel. In these aspects, transmitting the indication of the resource reservation by the RedCap UE may include transmitting the indication of the resource reservation in each predefined anchor sub-channel concurrently or simultaneously. In some aspects, transmitting the indication of the resource reservation may include transmitting the indication of the resource reservation in each predefined anchor sub-channel sequentially, or in a particular order. In aspects, the sequence or particular order in which the indication is transmitted in each of the multiple anchor sub-channels may include a predefined time domain pattern.

In one or more aspects, techniques for supporting hybrid systems SL operations according to one or more aspects may include additional aspects, such as any single aspect or any combination of aspects described below or in connection with one or more other processes or devices described elsewhere herein. In a first aspect, supporting hybrid systems SL operations may include an apparatus configured to obtain a resource reservation for a transmission over an SL. In the first aspect, the resource reservation reserves an SL resource in a resource pool for subsequently transmitting data from the UE, and the SL resource spans at least one sub-channel of a plurality of sub-channels. The apparatus is further configured to transmit an indication of the resource reservation to at least one other UE. In this aspect, the UE is of a first type and the at least one other UE is of a second type. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, transmitting the indication of the resource reservation to the at least one other UE includes obtaining an operating bandwidth of the at least one other UE.

In a third aspect, alone or in combination with the second aspect, transmitting the indication of the resource reservation to the at least one other UE includes determining whether the at least one sub-channel spanning the SL resource is included in the operating bandwidth of the at least one other UE.

In a fourth aspect, alone or in combination with one or more of the second through the third aspect, transmitting the indication of the resource reservation to the at least one other UE includes transmitting, when it is determined that the at least one sub-channel spanning the SL resource is included in the operating bandwidth of the at least one other UE, the indication of the resource reservation to the at least one other UE in a sub-channel of the operating bandwidth of the at least one other UE.

In a fifth aspect, alone or in combination with one or more of the first aspect through the fourth aspect, the at least one other UE includes a plurality of UEs and transmitting the indication of the resource reservation to the at least one other UE includes obtaining an operating bandwidth of each UE of the plurality of UEs.

In a sixth aspect, alone or in combination with the fifth aspect, transmitting the indication of the resource reservation to the at least one other UE includes determining which operating bandwidth of the operating bandwidth of each UE of plurality of UEs is spanned by the SL resource.

In a seventh aspect, alone or in combination with one or more of the fifth aspect through the sixth aspect, transmitting the indication of the resource reservation to the at least one other UE includes transmitting the indication of the resource reservation in each operating bandwidth of the operating bandwidth of each UE of plurality of UEs determined to be spanned by the SL resource.

In an eighth aspect, alone or in combination with one or more of the first aspect through the seventh aspect, obtaining the operating bandwidth of the at least one other UE includes receiving, from the at least one other UE, a broadcast transmission including one or more of an indication of a presence of the at least one other UE, and an indication of the operating bandwidth of the at least one other UE.

In a ninth aspect, alone or in combination with one or more of the first aspect through the eighth aspect, obtaining the operating bandwidth of the at least one other UE includes receiving, from a base station, the indication of the operating bandwidth of the at least one other UE.

In a tenth aspect, alone or in combination with one or more of the first aspect through the ninth aspect, the techniques in the first aspect may also include determining a presence of the at least one other UE based on a presence timer.

In an eleventh aspect, alone or in combination with the tenth aspect, determining the presence of the at least one other UE based on a presence timer includes determining that the at least one other UE is not present when the presence timer expires and no indication of the presence of the at least one other UE is received by the UE.

In a twelfth aspect, alone or in combination with one or more of the tenth aspect through the eleventh aspect, determining the presence of the at least one other UE based on a presence timer includes determining that the at least one other UE is present when an indication of the presence of the at least one other UE is received by the UE before the presence timer expires, and the presence timer is reset in response to receiving the indication of the presence of the at least one other UE.

In a thirteenth aspect, alone or in combination with one or more of the first aspect through the twelfth aspect, transmitting the indication of the resource reservation to the at least one other UE includes determining an operating bandwidth supported by each UE of the second type associated with the resource pool.

In a fourteenth aspect, alone or in combination with the thirteenth aspect, transmitting the indication of the resource reservation to the at least one other UE includes transmitting the indication of the resource reservation in each sub-channel of the operating bandwidth supported by each UE of the second type associated with the resource pool.

In a fifteenth aspect, alone or in combination with one or more of the first aspect through the fourteenth aspect, transmitting the indication of the resource reservation to the at least one other UE includes transmitting the indication of the resource reservation in at least one predefined anchor sub-channel, and the at least one other UE is configured to detect the indication of the resource reservation on the at least one predefined anchor sub-channel.

In a sixteenth aspect, alone or in combination with one or more of the first aspect through the fifteenth aspect, the at least one predefined anchor sub-channel includes a plurality of predefined anchor sub-channels, and transmitting the indication of the resource reservation to the at least one other UE includes transmitting the indication of the resource reservation in each predefined anchor sub-channel of the plurality of predefined anchor sub-channels concurrently.

In a seventeenth aspect, alone or in combination with the sixteenth aspect, transmitting the indication of the resource reservation to the at least one other UE includes transmitting the indication of the resource reservation in each predefined anchor sub-channel of the plurality of predefined anchor sub-channels sequentially. In the seventeenth aspect, a sequence of the transmission of the indication of the resource reservation in each predefined anchor sub-channel of the plurality of predefined anchor sub-channels is based on a predefined time domain pattern.

In an eighteenth aspect, alone or in combination with one or more of the first aspect through the seventeenth aspect, the techniques of the first aspect include transmitting the data over the SL in the reserved SL resource using a reduced maximum transmission power, and the reduced maximum transmission power is less than a transmission power used for SL transmissions by the UE when no UE of the second type is present.

In a nineteenth aspect, alone or in combination with one or more of the first aspect through the eighteenth aspect, the techniques of the first aspect include canceling, in response to a determination that the at least one other UE has failed to detect the indication of the resource reservation from the UE, the transmission the data over the SL in the reserved SL resource.

In a twentieth aspect, alone or in combination with one or more of the first aspect through the nineteenth aspect, the techniques of the first aspect include determining a resource reservation by the at least one other UE of an SL resource in the resource pool.

In a twenty-first aspect, alone or in combination with the twentieth aspect, obtaining the resource reservation includes obtaining the resource reservation of a different SL resource than the SL resource reserved by the at least one other UE.

In a twenty-second aspect, alone or in combination with one or more of the first aspect through the twenty-first aspect, the first type is a regular UE and the second type is a reduced capabilities UE.

In a twenty-third aspect, the techniques for supporting enhanced management of recovery timers in a wireless communication system according to one or more aspects may include obtaining a reservation of a resource for a subsequent data transmission over an SL in at least one sub-channel of a resource pool. In the twenty-third aspect, the at least one sub-channel is included in a first sub-channel group of a plurality of sub-channel groups. The techniques in the twenty-third aspect further include receiving an indication of a reservation of a resource from at least one other UE in a sub-channel of a second sub-channel group, and transmitting an indication of the reservation of the resource in a sub-channel of the first sub-channel group.

In a twenty-fourth aspect, alone or in combination with one or more of the first aspect through the twenty-third aspect, the first sub-channel group and the second sub-channel group at least partially overlap.

In a twenty-fifth aspect, alone or in combination with the twenty-fourth aspect, transmitting the indication of the reservation of the resource in the sub-channel of the first sub-channel group includes transmitting the indication of the reservation of the resource in a sub-channel overlapping between the first sub-channel group and the second sub-channel group when the resource reserved by the UE and the resource reserved by the at least one other UE are in the same sub-channel.

In a twenty-sixth aspect, alone or in combination with one or more of the first aspect through the twenty-fifth aspect, the sub-channel of the second sub-channel group and the sub-channel of the first sub-channel group are included in a set of pre-defined anchor sub-channels for transmitting indications of resource reservations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
    obtaining a resource reservation for a transmission over a sidelink (SL), wherein the resource reservation reserves a SL resource in a resource pool for transmitting data from the UE, the SL resource spanning at least one sub-channel of a plurality of sub-channels; and
    transmitting an indication of the resource reservation to at least one other UE, wherein the UE is a regular UE configured to operate over the plurality of the sub-channels and the at least one other UE is a reduced capabilities UE configured to operate over fewer than the plurality of the sub-channels, and wherein the indication of the resource reservation is transmitted in a manner configured to be detectable by the reduced capabilities UE.

2. The method of claim 1, wherein transmitting the indication of the resource reservation to the at least one other UE includes:
    obtaining an operating bandwidth of the at least one other UE;
    determining whether the at least one sub-channel spanning the SL resource is included in the operating bandwidth of the at least one other UE; and
    in response to determining that the at least one sub-channel spanning the SL resource is included in the operating bandwidth of the at least one other UE, transmitting the indication of the resource reservation to the at least one other UE in a sub-channel of the operating bandwidth of the at least one other UE.

3. The method of claim 2, wherein the at least one other UE includes a plurality of UEs, and wherein transmitting the indication of the resource reservation to the at least one other UE includes:
    obtaining an operating bandwidth of each UE of the plurality of UEs;
    determining which operating bandwidth of the operating bandwidth of each UE of the plurality of UEs is spanned by the SL resource; and
    transmitting the indication of the resource reservation in each operating bandwidth of the operating bandwidth of each UE of plurality of UEs determined to be spanned by the SL resource.

4. The method of claim 2, wherein obtaining the operating bandwidth of the at least one other UE includes one or more of:
receiving, from the at least one other UE, a broadcast transmission including one or more of:
an indication of a presence of the at least one other UE;
an indication of the operating bandwidth of the at least one other UE; and
receiving, from a base station, the indication of the operating bandwidth of the at least one other UE.

5. The method of claim 2, further comprising:
determining a presence of the at least one other UE based on a presence timer, wherein determining the presence of the at least one other UE based on a presence timer includes:
determining that the at least one other UE is not present when the presence timer expires and no indication of the presence of the at least one other UE is received by the UE; or
determining that the at least one other UE is present when an indication of the presence of the at least one other UE is received by the UE before the presence timer expires, and wherein the presence timer is reset in response to receiving the indication of the presence of the at least one other UE.

6. The method of claim 1, wherein transmitting the indication of the resource reservation to the at least one other UE includes:
determining an operating bandwidth supported by each UE of the reduced capabilities UE associated with the resource pool; and
transmitting the indication of the resource reservation in each sub-channel of the operating bandwidth supported by each UE of the reduced capabilities UE associated with the resource pool.

7. The method of claim 1, wherein transmitting the indication of the resource reservation to the at least one other UE includes:
transmitting the indication of the resource reservation in at least one predefined anchor sub-channel, wherein the at least one other UE is configured to detect the indication of the resource reservation based on receipt of the indication of the resource reservation via the at least one predefined anchor sub-channel.

8. The method of claim 7, wherein the at least one predefined anchor sub-channel includes a plurality of predefined anchor sub-channels, and wherein transmitting the indication of the resource reservation to the at least one other UE includes one of:
transmitting the indication of the resource reservation in each predefined anchor sub-channel of the plurality of predefined anchor sub-channels concurrently; and
transmitting the indication of the resource reservation in each predefined anchor sub-channel of the plurality of predefined anchor sub-channels sequentially, wherein a sequence of the transmission of the indication of the resource reservation in each predefined anchor sub-channel of the plurality of predefined anchor sub-channels is based on a predefined time domain pattern.

9. The method of claim 1, further comprising:
transmitting the data over the SL in the reserved SL resource using a reduced maximum transmission power, wherein the reduced maximum transmission power is less than a transmission power used for SL transmissions by the UE when no UE of the reduced capabilities UE is present.

10. The method of claim 1, further comprising:
in response to a determination that the at least one other UE has failed to detect the indication of the resource reservation from the UE, canceling the transmitting the data over the SL in the reserved SL resource.

11. The method of claim 1, further comprising:
determining a resource reservation by the at least one other UE of an SL resource in the resource pool, and wherein obtaining the resource reservation includes:
obtaining the resource reservation of a different SL resource than the SL resource reserved by the at least one other UE.

12. The method of claim 1, wherein transmitting the indication of the resource reservation to the at least one other UE includes transmitting the indication of the resource reservation in at least one predefined anchor sub-channel.

13. A method of wireless communication performed by a user equipment (UE), the method comprising:
obtaining a reservation of a resource for a data transmission over a sidelink (SL) in at least one sub-channel of a resource pool, wherein the at least one sub-channel is included in a first sub-channel group;
receiving an indication of a reservation of a resource from at least one other UE in a first sub-channel of a second sub-channel group; and
transmitting an indication of the reservation of the resource in a second sub-channel of the first sub-channel group, wherein the first sub-channel group and the second sub-channel group are selected from among a plurality of pre-defined sub-channel groups.

14. The method of claim 13, wherein the first sub-channel group and the second sub-channel group at least partially overlap, and wherein:
transmitting the indication of the reservation of the resource in the second sub-channel of the first sub-channel group includes, in response to the resource reserved by the UE and the resource reserved by the at least one other UE being in a same sub-channel, transmitting the indication of the reservation of the resource in a sub-channel overlapping between the first sub-channel group and the second sub-channel group.

15. The method of claim 13, wherein the indication of reservation of the resource from the at least one other UE is received in a pre-defined anchor sub-channel of the first sub-channel group, wherein the at least one other UE is configured to detect the indication of the reservation of the resource based on receipt of the indication of the reservation of the resource via the pre-defined anchor sub-channel of the first sub-channel group, and wherein the first sub-channel of the second sub-channel group and the second sub-channel of the first sub-channel group are included in a set of pre-defined anchor sub-channels for transmitting indications of resource reservations.

16. The method of claim 13, wherein the UE and the at least one other UE are reduced capabilities UEs.

17. A user equipment (UE) comprising:
a memory storing processor-readable code; and
at least one processor coupled to the memory, the at least one processor configured to execute the processor-readable code to cause the at least one processor to:
obtain a resource reservation for a transmission over a sidelink (SL), wherein the resource reservation reserves a SL resource in a resource pool for transmitting data from the UE, the SL resource spanning at least one sub-channel of a plurality of sub-channels; and transmit an indication of the resource reservation to at least one other UE, wherein the UE is a regular UE configured to operate over the plurality of the sub-channels and the at least one other UE is a reduced capabilities UE configured to operate over fewer than the plurality of the sub-channels, and wherein the indication of the resource reservation is transmitted in a manner configured to be detectable by the reduced capabilities UE.

18. The UE of claim 17, wherein the at least one processor configured to execute the processor-readable code to cause the at least one processor to transmit the indication of the resource reservation to the at least one other UE includes the at least one processor configured to execute the processor-readable code to further cause the at least one processor to:

obtain an operating bandwidth of the at least one other UE; and in response to a determination that an at least one sub-channel spanning the SL resource is included in the operating bandwidth of the at least one other UE, transmit the indication of the resource reservation to the at least one other UE in a sub-channel of the operating bandwidth of the at least one other UE.

19. The UE of claim 18, wherein the at least one other UE includes a plurality of UEs, and wherein the at least one processor configured to execute the processor-readable code to cause the at least one processor to transmit the indication of the resource reservation to the at least one other UE includes the at least one processor configured to execute the processor-readable code to further cause the at least one processor to:

obtain an operating bandwidth of each UE of the plurality of UEs;

determine which operating bandwidth of the operating bandwidth of each UE of the plurality of UEs is spanned by the SL resource; and transmit the indication of the resource reservation in each operating bandwidth of the operating bandwidth of each UE of plurality of UEs determined to be spanned by the SL resource.

20. The UE of claim 18, wherein the at least one processor to configured to execute the processor-readable code to cause the at least one processor to obtain the operating bandwidth of the at least one other UE includes the at least one processor configured to execute the processor-readable code to further cause the at least one processor to one or more of:

receive, from the at least one other UE, a broadcast transmission including one or more of:
 an indication of a presence of the at least one other UE;
 an indication of the operating bandwidth of the at least one other UE; and receive, from a base station, the indication of the operating bandwidth of the at least one other UE.

21. The UE of claim 18, further comprising the at least one processor configured to execute the processor-readable code to further cause the at least one processor to:

determine a presence of the at least one other UE based on a presence timer, wherein the at least one processor configured to execute the processor-readable code to cause the at least one processor to determine the presence of the at least one other UE based on the presence timer includes the at least one processor configured to execute the processor-readable code to further cause the at least one processor to:

determine that the at least one other UE is not present when the presence timer expires and no indication of the presence of the at least one other UE is received by the UE; or determine that the at least one other UE is present when an indication of the presence of the at least one other UE is received by the UE before the presence timer expires, and wherein the presence timer is reset in response to receiving the indication of the presence of the at least one other UE.

22. The UE of claim 17, wherein the at least one processor configured to execute the processor-readable code to cause the at least one processor to transmit the indication of the resource reservation to the at least one other UE includes the at least one processor configured to execute the processor-readable code to further cause the at least one processor to:

determine an operating bandwidth supported by each UE of the reduced capabilities UE associated with the resource pool; and transmit the indication of the resource reservation in each sub-channel of the operating bandwidth supported by each UE of the reduced capabilities UE associated with the resource pool.

23. The UE of claim 17, wherein the at least one processor to execute the processor-readable code to cause the at least one processor to transmit the indication of the resource reservation to the at least one other UE includes the at least one processor configured to execute the processor-readable code to further cause the at least one processor to:

transmit the indication of the resource reservation in at least one predefined anchor sub-channel, wherein the at least one other UE is configured to detect the indication of the resource reservation on the at least one predefined anchor sub-channel.

24. The UE of claim 23, wherein the at least one predefined anchor sub-channel includes a plurality of predefined anchor sub-channels, and wherein the at least one processor configured to execute the processor-readable code to cause the at least one processor to transmit the indication of the resource reservation to the at least one other UE includes the at least one processor configured to execute the processor-readable code to further cause the at least one processor to one of:

transmit the indication of the resource reservation in each predefined anchor sub-channel of the plurality of predefined anchor sub-channels concurrently; and transmit the indication of the resource reservation in each predefined anchor sub-channel of the plurality of predefined anchor sub-channels sequentially, wherein a sequence of the transmission of the indication of the resource reservation in each predefined anchor sub-channel of the plurality of predefined anchor sub-channels is based on a predefined time domain pattern.

25. The UE of claim 17, further comprising the at least one processor configured to execute the processor-readable code to further cause the at least one processor to:

transmit the data over the SL in the reserved SL resource using a reduced maximum transmission power, wherein the reduced maximum transmission power is less than a transmission power used for SL transmissions by the UE when no UE of the reduced capabilities UE is present.

26. The UE of claim 17, further comprising the at least one processor configured to execute the processor-readable code to further cause the at least one processor to:

in response to a determination that the at least one other UE has failed to detect the indication of the resource reservation from the UE, cancel the transmitting the data over the SL in the reserved SL resource.

27. The UE of claim 17, further comprising the at least one processor configured to execute the processor-readable code to further cause the at least one processor to:

determine a resource reservation by the at least one other UE of an SL resource in the resource pool, and wherein the at least one processor configured to execute the processor-readable code to cause the at least one processor to obtain the resource reservation includes the at least one processor configured to execute the processor-readable code to further cause the at least one processor to:

obtain the resource reservation of a different SL resource than the SL resource reserved by the at least one other UE.

28. A user equipment (UE) comprising:

a memory storing processor-readable code; and at least one processor coupled to the memory, the at least one processor configured to execute the processor-readable code to cause the at least one processor to:

obtain a reservation of a resource for a data transmission over a sidelink (SL) in at least one sub-channel of a resource pool, wherein the at least one sub-channel is included in a first sub-channel group;

receive an indication of a reservation of a resource from at least one other UE in a first sub-channel of a second sub-channel group; and transmit an indication of the reservation of the resource in a second sub-channel of the first sub-channel group, wherein the first sub-channel group and the second sub-channel group are selected from among a plurality of pre-defined sub-channel groups.

29. The UE of claim 28, wherein the first sub-channel group and the second sub-channel group at least partially overlap, and wherein the at least one processor configured to execute the processor-readable code to cause the at least one processor to transmit the indication of the reservation of the resource in the second sub-channel of the first sub-channel group includes, in response to the resource reserved by the UE and the resource reserved by the at least one other UE being in a same sub-channel, the at least one processor configured to execute the processor-readable code to further cause the at least one processor to transmit the indication of the reservation of the resource in a sub-channel overlapping between the first sub-channel group and the second sub-channel group.

30. The UE of claim 28, wherein the first sub-channel of the second sub-channel group and the second sub-channel of the first sub-channel group are included in a set of pre-defined anchor sub-channels for transmitting indications of resource reservations.

* * * * *